US011119028B2

(12) United States Patent
Van Der Sluis (10) Patent No.: US 11,119,028 B2
(45) Date of Patent: Sep. 14, 2021

(54) OPTICAL PARTICLE SENSOR AND SENSING METHOD

(71) Applicant: KONINKLIJKE PHILIPS N.V., Eindhoven (NL)

(72) Inventor: Paul Van Der Sluis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/483,890

(22) PCT Filed: Jan. 31, 2018

(86) PCT No.: PCT/EP2018/052320
§ 371 (c)(1),
(2) Date: Aug. 6, 2019

(87) PCT Pub. No.: WO2018/145962
PCT Pub. Date: Aug. 16, 2018

(65) Prior Publication Data
US 2020/0018683 A1 Jan. 16, 2020

(30) Foreign Application Priority Data
Feb. 9, 2017 (EP) .................................... 17155387

(51) Int. Cl.
*G01N 15/14* (2006.01)
(52) U.S. Cl.
CPC ..... *G01N 15/1427* (2013.01); *G01N 15/1431* (2013.01); *G01N 15/1459* (2013.01)

(58) Field of Classification Search
CPC ........... G01N 15/1427; G01N 15/1429; G01N 15/1431; G01N 15/1459;
(Continued)

(56) References Cited

U.S. PATENT DOCUMENTS

| | | | |
|---|---|---|---|
| 3,579,249 A | 5/1971 | Dewey | |
| 4,713,534 A | 12/1987 | Masters | |

(Continued)

FOREIGN PATENT DOCUMENTS

| | | |
|---|---|---|
| WO | 92/07245 | 4/1992 |
| WO | 96/34270 | 10/1993 |

(Continued)

OTHER PUBLICATIONS

International Search Report and Written Opinion dated May 2, 2018 for International Application No. PCT/EP2018/052320 Filed Jan. 31, 2018.

(Continued)

*Primary Examiner* — Tri T Ton (57) ABSTRACT

An optical particle sensor comprises at least first and second light sources of different wavelength for sequential operation. An optical detector is used to detect light from the light sources emitted or scattered by particles to be sensed. A current injection compensation signal is also provided which is dependent on which light source of the optical arrangement is in use. The compensation signal means the amplifier does not need to re-settle in response to different background illumination levels associated with the different light sources. In this way, detection signals may be obtained in quick succession from different light sources.

20 Claims, 4 Drawing Sheets

(58) Field of Classification Search
CPC ... G01N 2015/1488; G01N 2021/6419; G01N 21/47; B29D 11/00269; B29D 11/00298; B29D 11/00365; B29D 11/00932; B29K 2063/00; B29K 2883/00; C08G 59/02; G02B 1/041; G02B 3/00; G02B 3/0031; G02B 3/08
USPC .................................................. 356/335–343
See application file for complete search history.

(56) References Cited

U.S. PATENT DOCUMENTS

| | | | | |
|---|---|---|---|---|
| 2006/0197033 | A1* | 9/2006 | Hairston | G01N 21/53 250/458.1 |
| 2009/0122311 | A1* | 5/2009 | Kanda | G01N 21/51 356/318 |
| 2010/0013395 | A1 | 1/2010 | Archibald | |
| 2011/0181870 | A1 | 7/2011 | Penney | |
| 2011/0194111 | A1 | 8/2011 | Dohi | |
| 2013/0201316 | A1* | 8/2013 | Binder | H04L 67/12 348/77 |

FOREIGN PATENT DOCUMENTS

| | | |
|---|---|---|
| WO | 2009/050619 | 4/2009 |
| WO | 2013/008014 | 1/2013 |
| WO | 2018/077704 | 5/2018 |
| WO | 2018/177972 | 10/2018 |

OTHER PUBLICATIONS

Mitsumoto, et al, "Classification of pollen species using autofluorescence image analysis", Journal of Bioscience and Bioengineering, vol. 107, Issue 1, Jan. 2009, pp. 90-94.

Roshchina V.V., "Vital Autofluorescence: Application to the Study of Plant Living Cells", Hindawi Publishing Corporation, International Journal of Spectroscopy, vol. 2012, Article ID 124672.

* cited by examiner

FIG. 6  Time (s)

FIG. 7

OPTICAL PARTICLE SENSOR AND SENSING METHOD

CROSS REFERENCE TO RELATED APPLICATIONS

This application is the U.S. National Phase application under 35 U.S.C. § 371 of International Application No. PCT/EP2018/052320 filed Jan. 31, 2018, published as WO 2018/145962 on Jan. 31, 2018, which claims the benefit of European Patent Application Number 17155387.8 filed Feb. 9, 2017. These applications are hereby incorporated by reference herein.

FIELD OF THE INVENTION

This invention relates to optical particle sensors and sensing methods.

BACKGROUND OF THE INVENTION

Particle sensors are for example used to measure the level of pollution in the air.

Low-cost systems are available based on the measurement of light scattered at the particles which pass along with an air flow through a detection volume in the sensor. This air flow is for example driven by a fan or a heater. Each particle is illuminated by a continuous light source and creates a light pulse with a duration determined by the passage time of the particle through the detection volume.

These pulses are amplified, filtered and counted in an electronics system. In addition to indicating the particle concentration level, such detectors can be used to drive the operation of an air purifier device.

Particulate air pollution has been associated with increased morbidity and mortality from respiratory and cardiac disease and with allergic reactions. The precise effects on human health depend on the type of particle present.

Thus, there is a need to identify which types of particle are present in addition to providing a concentration level.

Fine particles, larger than about 0.5 μm can be counted individually by optical means using existing technology as outlined above. In most cases, a cheap and efficient LED or laser with a red or near infra-red wavelength is used. Pollen detectors are commercially available which operate in this way.

A pollen detector can generally detect one type of pollen and discriminate from the presence of dust, but it cannot distinguish between more pollen types or fungal spores.

In order to identify which type of particle is present (dust or which type of pollen or fungal spore), the particle may be illuminated with multiple light sources, such as visible (400 nm to 760 nm), infrared (760 nm to 3000 nm) and UV wavelengths (200 nm to 400 nm). The UV illumination can give rise to fluorescence whereas the visible and IR illumination give rise to scattering. The ratio between these different effects can be used to identify the type of particle. This is for example disclosed in the article "Classification of pollen species using autofluorescence image analysis", J Biosci Bioeng. 2009 January; 107(1):90-4, or Vital Autofluorescence: "Application to the Study of Plant Living Cells", International Journal of Spectroscopy, Volume 2012 (2012), Article ID 124672.

These methods currently require expensive professional equipment.

One of the problems to be overcome if a lower cost consumer solution is to be found is that the detector and electronics are slow. For increased sensitivity, the detector is typically a photo-transistor or photo-Darlington transistor circuit, and these components are inherently slow. To reduce noise in the amplifier, the signal is filtered to amplify only signals with frequencies corresponding to the time scale of a single particle passing.

For the identification of a particle it is important to look at multiple wavelengths as explained above. One approach is to switch on different LEDs during the passage of a single particle. By operating the LEDs with a low duty cycle, the intensity during the LED operation can be higher than the continuous current damage threshold.

However, the different LEDs will have different levels of background scattering. This will give rise to large disturbances in the detector-amplifier chain since the detector and electronics cannot respond quickly enough to the new level of background scattering: the particle will be gone before the detector-amplifier is stable again.

US 2009/0122311 discloses an optical detector in which multiple light sources are used to illuminate a sample. A set of photomultiplier tubes is employed. Different photo-multiplying voltages are used by the different tubes and for different light sources to provide signals of the same scale. This rescaling does not assist with stabilization at the detection side.

There remains a need for a detection circuit which enables rapid switching between different light sources to enable particle characterization as well as concentration measurement.

SUMMARY OF THE INVENTION

The invention is defined by the claims.

According to examples in accordance with an aspect of the invention, there is provided an optical particle sensor, comprising:

an optical arrangement comprising at least first and second light sources of different wavelengths for sequential operation;

an optical detector for detecting light emitted from particles to be sensed or light from the light sources scattered by particles to be sensed and generating a detection current;

an amplifier circuit for amplifying the detection current output from the optical detector; and a compensation circuit for providing a current injection compensation signal to the amplifier circuit which combines with the detection current; and a controller, wherein the controller is adapted to provide a current injection compensation signal which is dependent on which light source of the optical arrangement is in use.

This circuit includes a compensation circuit for the amplifier circuit so that the amplifier circuit does not need to re-settle in response to different background illumination levels associated with different light sources. Instead, a compensation signal in the form of a current is combined with the detection current, so that the background illumination level appears the same to the amplifier circuit for different light sources. The current injection compensation signal thus replicates the response of the optical detector so that they may be combined and then generate a signal which would have been generated by the optical detector if the background illumination had remained constant. In this way, detection signals may be obtained in quick succession from different light sources. Light scattering signals at different wavelengths may then be obtained during the passage of an individual particle through the optical particle sensor.

The compensation circuit may comprise a voltage source for controlling a level of current injection. This can easily and quickly be controlled to adjust the command signal (i.e. voltage) which then causes the desired current injection compensation signal to be provided, so that it is timed with the changeover between light sources.

The compensation circuit may comprise a delay circuit for coupling the voltage from the voltage source to the amplifier circuit and generating the current injection signal from the voltage source voltage. This delay means the compensation signal is provided to the amplifier circuit in a way which takes account of the response characteristics of the optical detector such as a phototransistor. The aim is to provide continuous background while different light sources are used, and when switching between light sources.

The delay circuit for example comprise a low pass filter. This provides a simple way to implement an RC delay. The current injection compensation signal is provided from the output of the low pass filter to the output of the optical detector. Thus, for the remainder of the amplifier chain, the background level of the signal to be amplified does not appear to have changed, and as far as the amplifier circuit is concerned, the current injection compensation signal may be considered to have been generated by the optical detector.

The optical arrangement may comprise a visible light source, an infrared light source and an ultraviolet light source. The three corresponding signal measurements may then be combined to provide particle type determination.

The amplifier circuit for example comprises an operational amplifier.

The sensor preferably further comprises a controller, which is adapted to control the timing of operation of the light sources of the optical arrangement and the level of the compensation signal over time. The controller may be further adapted to provide an identification of a type of particle based on analysis of the amplifier output during activation of the different light sources of the optical arrangement.

The amplifier circuit may comprise a high pass filter, for signal offset cancellation.

The invention also provides an optical particle sensing method, comprising:

in a sequence, operating at least first and second light sources of different wavelengths of an optical arrangement;

detecting light emitted from particles to be sensed or light from the light sources scattered by particles to be sensed thereby generating a detection current;

amplifying the detection current; and providing a compensation signal which combines with the detection current for amplification with the detection current, the level and timing of the compensation signal being dependent on which light source of the optical arrangement is in use.

This method enables seamless or near seamless detection of reflected or scattered light from particles for a sequence of light sources. The background signal cancellation for example comprises high pass filtering.

The compensation signal for example is generated by a voltage which controls a level of current injection, and it may be provided with a delay which matches a time response of the optical sensor. An infrared light output and an ultraviolet light output may be provided in a sequence (in any order), or an infrared light output, an ultraviolet light output and a visible light output may be provided in a sequence (in any order).

The optical particle sensing method may be a method for differentiating between different types of particles, for example differentiating between different types of pollen.

The invention may be implemented at least in part by software.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an optical particle sensor which comprises at least first and second light sources, of different wavelength, for sequential operation. An optical detector is used to detect light from the light sources reflected or scattered by particles to be sensed. A current injection compensation signal is also provided which is dependent on which light source of the optical arrangement is in use. The compensation signal means the amplifier does not need to re-settle in response to different background illumination levels associated with the different light sources. In this way, detection signals may be obtained in quick succession from different light sources.

Figure 1:
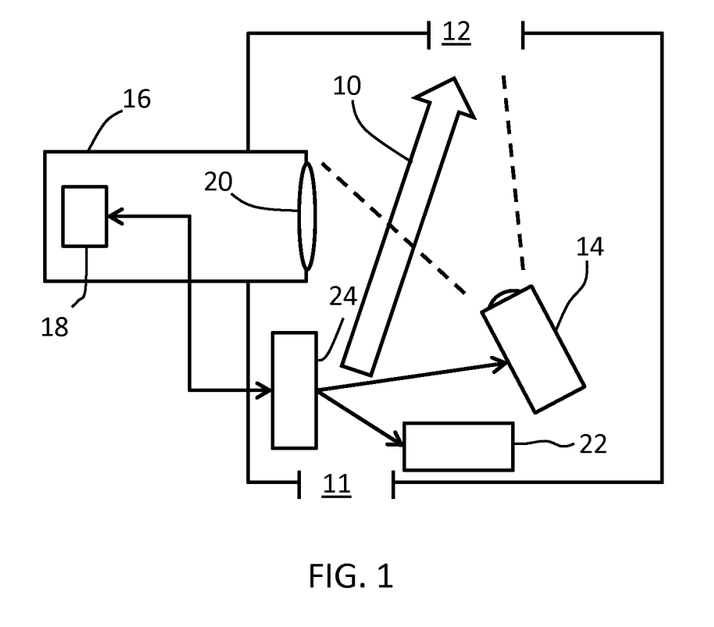
FIG. 1 shows an optical particle sensor.

FIG. 1 shows an example of an optical sensor to which the invention may be applied. There is a gas flow 10 from an inlet 11 to an outlet 12 of the overall sensor device. A light source arrangement 14, in particular an LED arrangement, for producing multiple wavelengths is used to illuminate the gas flow to enable optical detection of entrained particles based on optical measurements of scattering and/or fluorescence. The LED arrangement is to one side of the detection volume and the sensing is carried out at the opposite side. An alternative design may make use of reflection of light.

Thus, light may be detected which is emitted by the particles (in response to UV light stimulation) or light may be detected which is reflected or scattered by the particles. In the latter case, the light is the same light which was output by the light source.

An optical sensor 16 comprises a phototransistor sensor 18 and a focusing lens 20 at which scattered light (or fluorescence light) is collected.

A heater 22 is used for inducing convective flow through the sensor device. By the resulting buoyancy, the air flows towards the top of the detector, carrying the particles through the detection volume.

A controller 24 controls the processing of the sensor signals and operation of the heater and light source. This processing of the sensor signals includes application of a compensation signal into the amplifier chain, as explained in detail below.

The sensor may further comprise a detector for detecting when a particle enters the gas flow 10, to then control the timing of operation of the LED arrangement.

The first light source is normally on. The first light source is for example an efficient high power red or near infrared LED. As soon as a particle is detected (because the scattering increases), the first light source is briefly switched off and replaced with a second light source which is switched on, in order to determine the scattering or fluorescence separate to the scattering in the red or near infrared wavelength.

The light source arrangement may comprise only LEDs or there may be a combination of LEDs and laser diodes or indeed lasers. There are preferably three light sources, but the invention may be applied to a system with two light sources or indeed more than three light sources. More light sources enable more accurate discrimination between particle types, because a greater number of particle characteristics (i.e. fluorescence or scattering properties at a greater number of wavelengths) are obtained.

The use of fluorescent detection in combination with near infrared detection for example enables discrimination between organic fluorescent particles and inorganic non-fluorescent particles. Both will scatter the red or near infrared light, but only the biological fluorescent particles will give a fluorescent signal.

The detection volume is part of a housing which is placed on a printed circuit board with the electronics to convert the signal due to the particles into a count as well as to provide a degree of particle identification. The internal shape of the housing is such that leakage of light directly towards the phototransistor sensor, which would give a background signal, is kept to minimum. Furthermore, a phototransistor has a leakage current that will show up as a background even in the total absence of light. By electronically filtering out any remaining DC signal, the pulsed particle signal remains. This filtering process is described in further detail below.

As mentioned above, the different LEDs (or other light sources) of the light source arrangement 14 will have different levels of background scattering. This will give rise to large disturbances in the detector-amplifier chain since the detector and electronics cannot respond quickly enough to the new level of background scattering.

Figure 2:
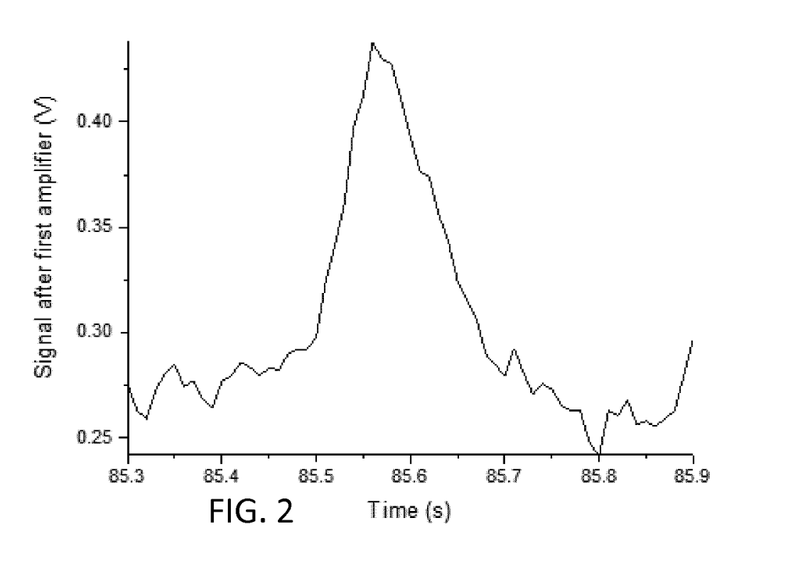
FIG. 2 shows the signal captured from a particle as it passes along the detection channel.

FIG. 2 shows the scattered signal of a single smoke particle passing by as seen by a single LED when the particle passes through the detection volume. There is a detection peak with a duration of around 0.2 s. If this particle needs to be seen by a second LED, that has to be performed within 0.1 s.

However, when the first LED is switched off and the second LED is switched on, the background scattering changes. Because of the slow response of the detector and the filtering in the detector circuit, it typically takes almost 4 seconds before such a circuit is able to detect particles again.

Figure 3:
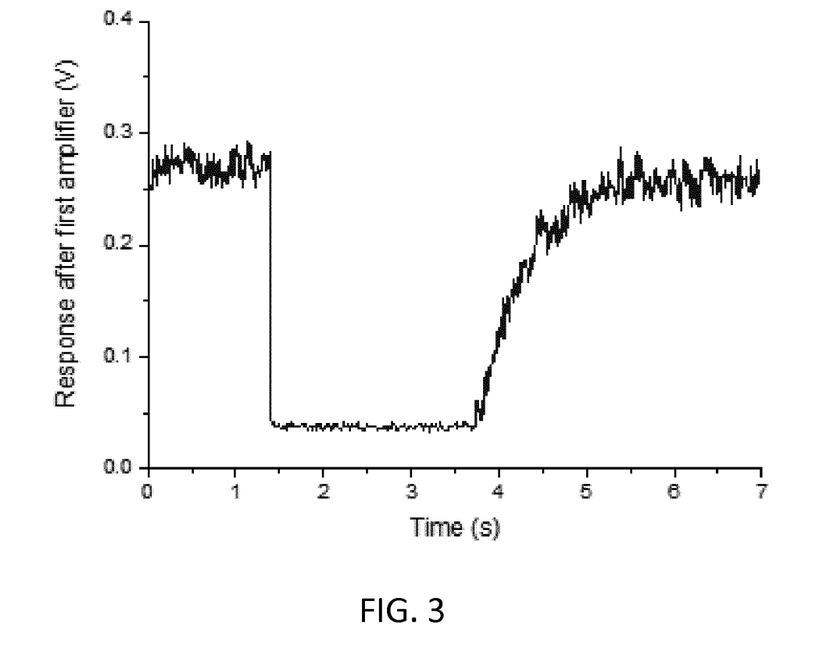
FIG. 3 shows the amplified signal when there is a change in the light source for a conventional amplifier.

FIG. 3 shows the response from a second LED after turning off the first LED and turning on the second LED. There is a drop in the background scattering level so the amplified signal drops while the amplifier adjusts its settings. By the time the detection circuit is ready to receive scattered signals from the second LED, the particle has passed and cannot be measured.

Optimizing the detector chain can limit the disturbance time to about 1.5 seconds, but that remains far too long.

In order to prevent disturbance by the change in background signal level, the background level change as seen by the amplifier may be electronically compensated in accordance with this invention.

Figure 4:
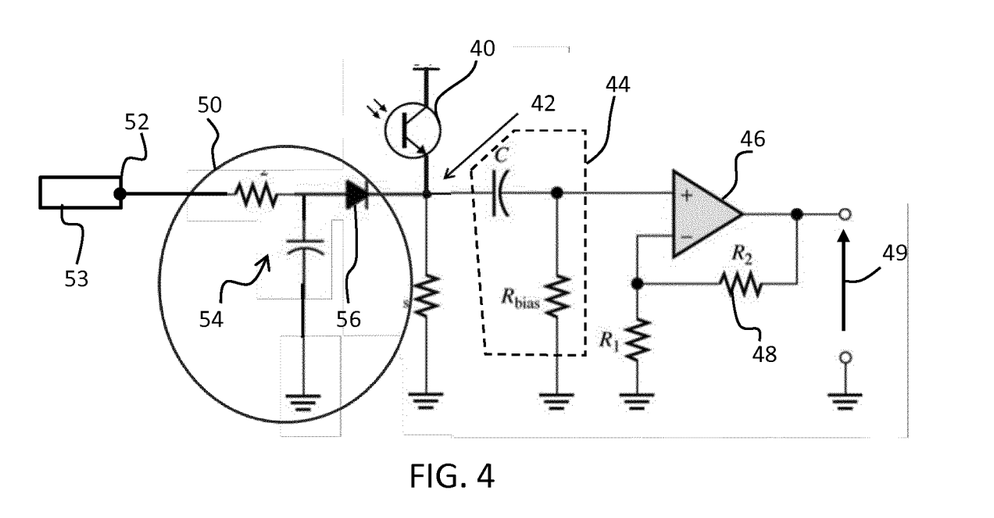
FIG. 4 shows an amplifier circuit for use in the sensor of FIG. 1.

FIG. 4 shows an amplifier detection circuit.

The optical detector (i.e. the phototransistor sensor 18 of FIG. 1) is shown as a single phototransistor 40, although other optical detectors and optical detector circuits may be used. The light level controls the current delivered to a node 42 and hence the voltage at the node. The initial output of the optical detector is thus a detection current, which is then processed in the detection and amplification circuit to provide a voltage level for amplification and analysis.

The node 42 is the input of a high pass RC filter 44. The charging of the capacitor of the high pass filter 44 implements a DC offset cancellation function. The high pass filtered signal is provided to the non-inverting input of an amplifier 46, with a gain set by the negative feedback path 48. The output of the amplifier is shown as reference 49.

There are other circuits instead of a high pass filter that can be used for offset cancellation, such as an operational amplifier circuit to implement a subtraction. Many other signal cancellation circuits are possible. The offset cancellation may be performed inside the amplifier itself.

In the example shown above, the background level of the second LED is lower than of the first LED. Thus, the capacitor of the high pass filter needs to discharge before a signal can be measured, and the phototransistor is also inherently slow. This slow response also automatically filters high frequency noise. A photodiode will have a faster response but reduced sensitivity.

The circuit of FIG. 4 has a current injection circuit 50 to which a control voltage (i.e. an injection voltage for controlling a level of compensation current injection) 52 is provided from a voltage source 53 (which may be part of the controller 24). The current injection circuit functions as a background level compensation circuit. There is an RC low pass filter 54, which charges an output node to the voltage at the terminal 52. The voltage is used to create an injection current through diode 56, which is provided between the output of the low pass filter 54 and the output of the optical detector. The diode current is provided to the node 42 so that it is seen by the rest of the circuit as equivalent to current generated by the detector 40. Thus, node 42 performs a current addition of the compensation current injected from the circuit 50 and the current output from the optical detector.

This delay matching may for example instead be implemented by using a programmable voltage generator so that the original voltage waveform provides the desired matching to the response of the detector circuit.

In the example shown, when switching from the first to the second LED, additional current is required to represent the background illumination level that was present while the first LED was illuminated.

The current injection circuit 50 comprises a time delay circuit in this example in the form of an RC network. This is so that the change in the compensation current matches the response time of the phototransistor.

Figure 5:
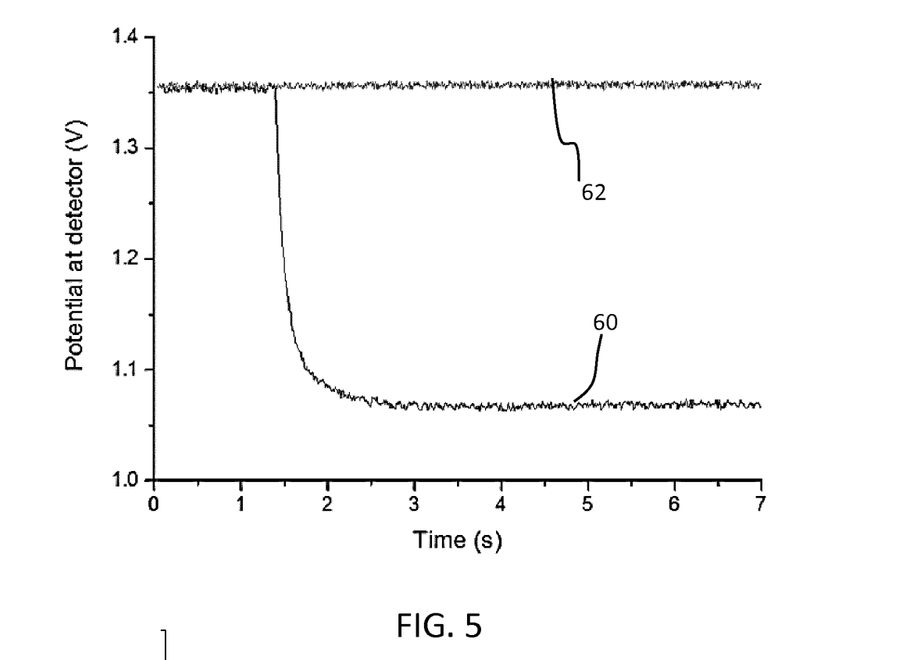
FIG. 5 shows the signal at the detector when there is a change in the light source and using the amplifier circuit of FIG. 4 compared to the signal with a conventional amplifier.

FIG. 5 shows as plot 60 the background level 60 as picked up at the node 42 at the output of the detector 40, when switching from one LED to the other at approximately 1.4 s. After about 1 second the new background level is measured.

Plot 62 shows the background level remaining constant as a result of the current injection provided by the compensation circuit 50. By adding additional current with the right delay (to match the decrease in signal of slope 60) a virtually stable background can be observed as plot 62.

Figure 6:
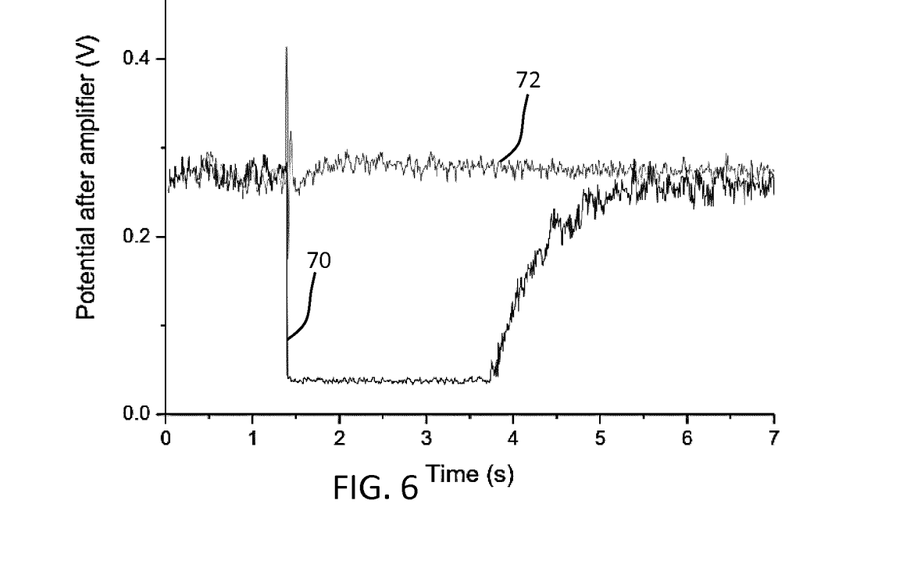
FIG. 6 shows the amplified signal when there is a change in the light source using the amplifier circuit of FIG. 4 compared to the signal with a conventional amplifier.

FIG. 6 shows the corresponding signal 49 at the output of the amplifier. Plot 70 shows the same plot as in FIG. 3. Plot 72 shows the improvement provided by the background compensation system explained above. Apart from a short (<50 ms) glitch, the simple RC current addition circuit results in a detector circuit that remains sensitive over time.

The circuit functions in an analogous way when second LED happens to have a higher background signal level.

With a more advanced signal processing circuit, the glitch can be made even smaller and shorter.

The precise level of current injection needed, and hence the compensation voltage required, can be determined in the absence of particles (since it relates to background signal levels) and can be carried out automatically as part of a (regular) system calibration.

Figure 7:
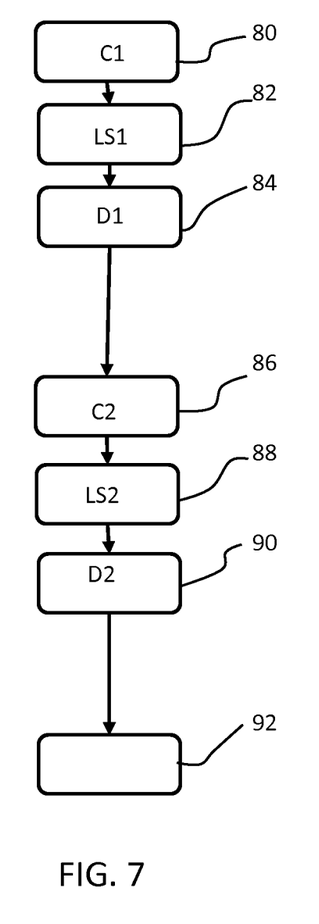
FIG. 7 shows an optical particle sensing method.

FIG. 7 shows an optical particle sensing method.

In step 80, a first compensation signal C1 is applied to the amplifier chain,

In step 82, a first light source LS1 is operated.

In step 84, a first detector signal D1 is obtained, by amplification with background signal cancellation. Steps 80, 82, and 84 are performed simultaneously.

In step 86, a second compensation signal C2 is applied to the amplifier chain,

In step 88, a second light source LS2 is operated.

In step 90, a second detector signal D2 is obtained by amplification with background signal cancellation. Steps 86, 88 and 90 are performed simultaneously.

Thus, the first and second light sources of different wavelengths are operated in a sequence.

In step 92, the two detector signals are combined to determine a particle type, based on the combined fluorescence or scattering properties at the two different wavelengths.

The method may be extended to third or further light sources and detector signals. The detector signals are preferably obtained for a single particle during a single transit through the particle sensor. Thus, the total sensing period for obtaining all of the detector signals is typically less than 0.5 s.

The invention may be used in low cost consumer air purifiers and related products.

The example above makes use of a single optical detector. However, there may be multiple detectors, each optimized to different light sources. Even with multiple detectors, switching between different light sources will cause a shift in background, and the compensation approach described above enables the system to remain sensitive despite changes to the light source being used.

As discussed above, embodiments make use of a controller 24 to implement the processing of the sensor information and control of the compensation circuit. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An optical particle sensor, comprising:
   an optical arrangement including at least first and second light sources of different wavelengths for sequential operation;
   an optical detector for detecting light emitted from particles to be sensed or light from the light sources scattered by particles to be sensed and generating a detection current;
   an amplifier circuit for amplifying the detection current output from the optical detector;
   a compensation circuit for providing a current injection compensation signal to the amplifier circuit which combines with the detection current; and
   a controller, wherein the controller is adapted to provide the current injection compensation signal dependent on which light source of the optical arrangement is in use.

2. The sensor as claimed in claim 1, wherein the compensation circuit includes a voltage source for controlling a level of current injection.

3. The sensor as claimed in claim 2, wherein the compensation circuit includes a delay circuit for coupling the voltage from the voltage source to the amplifier circuit and generating the current injection compensation signal.

4. The sensor as claimed in claim 3, wherein the delay circuit includes a low pass filter, wherein the current injection compensation signal is provided from the output of the low pass filter to the output of the optical detector.

5. The sensor as claimed in claim 1, wherein the optical arrangement includes an infrared light source and an ultraviolet light source and optionally also a visible light source.

6. The sensor as claimed in claim 1, wherein the amplifier circuit includes an operational amplifier.

7. The sensor as claimed in claim 1, wherein the controller is adapted to control the timing of operation of the light sources of the optical arrangement and the level of the compensation signal over time.

8. The sensor as claimed in claim 7, wherein the controller is further adapted to provide an identification of a type of particle based on analysis of the amplifier output during activation of the different light sources of the optical arrangement.

9. The sensor as claimed in claim 1, wherein the amplifier circuit includes a high pass filter.

10. An optical particle sensing method, comprising:
   in a sequence, operating at least first and second light sources of different wavelengths of an optical arrangement;
   detecting light emitted from particles to be sensed or light from the light sources scattered by particles to be sensed thereby generating a detection current;
   amplifying the detection current; and
   providing a current injection compensation signal which combines with the detection current for amplification with the detection current, wherein the level and timing of the compensation signal is dependent on which light source of the optical arrangement is in use.

11. The method as claimed in claim 10, further comprising:
   high pass filtering the combination of the detection current and the current injection compensation signal.

12. The method as claimed in claim 10, further comprising:
   generating the current injection compensation signal by a voltage which controls a level of current injection.

13. The method as claimed in claim 12, wherein the current injection compensation signal is provided with a delay which matches a time response in the detecting the light emitted from particles to be sensed or light from the light sources scattered by particles to be sensed.

14. The method as claimed in claim 10 wherein the operating the at least first and second light sources of different wavelengths in a sequence includes providing in a sequence an infrared light output and an ultraviolet light output and optionally also a visible light output.

15. The computer program comprising computer code means which is adapted, when run on a computer, to implement the method of claim 10.

16. The sensor as claimed in claim 1, wherein an output of the optical detector and an output of the compensation circuit are connected at a node for combining the detection current and the current injection compensation signal at the node.

17. The sensor as claimed in claim 16, wherein the compensation circuit includes a current injection circuit connecting a voltage source to the node.

18. The sensor as claimed in claim 16, wherein the input of the amplifier circuit is connected the node.

19. The sensor as claimed in claim 18, wherein the amplifier circuit includes a high pass filter connecting an operational amplifier to the node.

20. The sensor as claimed in claim 19,
   wherein the operational amplifier has a non-inverting input connected to the high pass filter; and
   wherein the operational amplifier further has an inverting input and a output connected to a negative feedback circuit.

* * * * *